United States Patent [19]

Nitz

[11] Patent Number: 4,901,209
[45] Date of Patent: Feb. 13, 1990

[54] ILLUMINATED BICYCLE FRAME

[76] Inventor: James C. Nitz, 4250 Executive Square, Suite 801, La Jolla, Calif. 92037

[21] Appl. No.: 229,276

[22] Filed: Aug. 5, 1988

[51] Int. Cl.$^4$ .............................................. B62J 6/00
[52] U.S. Cl. ....................................... 362/72; 362/32; 362/78; 280/281.1; 280/288.4
[58] Field of Search ............................ 362/32, 72, 78; 340/134; 280/281 R, 289 R

[56] References Cited

U.S. PATENT DOCUMENTS

| | | | |
|---|---|---|---|
| 2,233,039 | 2/1941 | Vianzone | 362/193 |
| 2,561,756 | 8/1951 | Shook | 362/32 |
| 3,113,727 | 12/1963 | Bradway | 362/78 |
| 3,890,497 | 6/1975 | Rush | 362/32 |
| 3,987,409 | 2/1976 | Freeman | 340/134 |
| 4,088,882 | 5/1978 | Lewis | 362/72 |
| 4,274,127 | 6/1981 | Beck et al. | 362/72 |
| 4,319,307 | 3/1982 | Turner | 362/191 |
| 4,337,503 | 6/1982 | Turner | 362/72 |
| 4,408,260 | 10/1983 | Miedel | 362/32 |
| 4,422,719 | 12/1983 | Orcutt | 362/32 |
| 4,444,435 | 4/1984 | Honsa | 301/63 PW |
| 4,493,749 | 1/1985 | Brezing | 280/281 R |
| 4,562,516 | 12/1985 | Chastain | 362/78 |
| 4,562,832 | 1/1986 | Wilder et al. | 362/32 |
| 4,598,339 | 7/1986 | Ainsworth | 280/289 R |
| 4,623,954 | 11/1986 | Schott et al. | 362/72 |

Primary Examiner—Ira S. Lazarus
Assistant Examiner—David G. Messer
Attorney, Agent, or Firm—Charles C. Logan; David L. Baker

[57] ABSTRACT

An illuminated bicycle having a body frame, a handlebar and wheels formed of hollow tubular members made of plastic material that allows light to be transmitted radially through their side walls. A high intensity lamp is mounted at a predetermined location within one of the hollow tubular members. A bundle of flexible elongated optical fibers have their one end positioned adjacent the high intensity lamp so that light therefrom would be transmitted through the optical fibers. The optical fibers are threaded throughout the hollow tubular members of the bicycle body frame so that when the lamp is illuminated the hollow tubular members will glow and make them highly visible at night. The lamp may be powered by batteries or a small bicycle generator.

6 Claims, 2 Drawing Sheets

ILLUMINATED BICYCLE FRAME

BACKGROUND OF THE INVENTION

The invention relates to bicycles and more specifically to specific structure for a bicycle that allows several of its major components to be illuminated at night.

There are a lot of bicycles on the roads and each year more bicycles are sold. Many of these bicycles and riders are involved in accidents with automobiles. Usually the reason for the accident is that the bicycle is not highly visible to the automobile driver. Unfortunately, children are seriously injured because they were not seen by the auto driver in time to avoid an accident. Reflectors on bicycles and on the clothing of the riders are a distinct improvement over not having reflectors, but, reflectors themselves do not do enough to prevent some accidents. If cyclist were more visible, especially children which do not always concern themselves with street traffic, there would be fewer accidents. Both lives and injuries would be saved.

Applicant's invention provides a novel structure for illumination of bicycles. The illumination not only lights the object but in so doing makes the object known distinctly as a bicycle. High visibility will increase awareness and thus reduce the number of accidents and loss of life or of serious injury. Additionally, the "Glo-bike" will most likely become a popular item with young children and the demand to own an illuminated bicycle will grow. Even the add-on kits of glowing handlebars or wheels would provide a level of safety not heretofore available.

There is, therefore, a need for a product that will brightly illuminate bicycles at night or at dusk. Bicycles thus illuminated could be quickly recognized as bicycles due to the fact that the frame of the bicycle is outlined. Drivers would have an extra moment of recognition and many lives and injuries would be saved.

SUMMARY OF THE INVENTION

Applicant's novel safety lighting system has been designed to be installed in bicycle frames, handlebars and certain types of wheels. The source of power for the operation of the safety lighting system are common flashlight batteries or by a small bicycle generator.

The bicycle frame would be formed of clear sturdy plastic which is tubular in construction. Within the hollow portion of the clear plastic bicycle frame are threaded flexible elongated optical fibers. These optical fibers would be made of a material which transmits light well, and which is capable of being bent around the corners at angles common bicycle frames. The elongated optical fibers glow along their entire length when connected to a light source. Thus, the optical fibers threaded throughout the frame of a bicycle will illuminate the entire outline of the bicycle frame.

When fed by a powerful light source, the light transmitting plastic bicycle frame will glow, allowing the bicycle frame to be seen for great distances at night. The invention provides the advantage of not depending upon reflected light to be seen. Reflected light has the disadvantage of requiring a reflector to be struck by the light source. Bicycles equipped with the invention will be seen even when the bicycles are at an angle to the cars passing by, due to the self-illumination feature.

The lighting source of the invention is a powerful lamp housed inside a protective container. The light source could be located at any point in the bicycle frame, but the preferred position would be under the seat and inside the seat post support for protection from the weather or possible damage.

In order to allow the unit to be more versatile, separate lighting units are possible for the handlebar and for the wheels. These lighting units could be addon units for those not currently owning a bicycle having the "Glo-like∞ bicycle frame. The handlebar units would be simply the glowing handlebar configuration. The bicycle wheel units would require structure for transmitting electrical energy to lights within the wheel while the wheel is rotating. A common structure for accomplishing this type of energy transfer would be to employ the use of electrical brushes over a rotating shaft which conducts electricity. A bicycle equipped with the full "Glo-like" concept would have a glowing frame, glowing handlerbars and glowing rotating wheels. The wheels could be of any design.

The outer surface of the plastic bicycle frame could be in various colors, such as hunters orange for high visibility at night. Thus when the bicycle frame is lighted, the selected color would be light displaying the bicycle in bright colorful array. Kids would enjoy riding the bicycles and would be much safer from accidents due to high visibility. The clear plastic frame would be sturdy and provide years of service in a light frame.

THE DESCRIPTION OF THE PREFERRED EMBODIMENT

Figure 1:
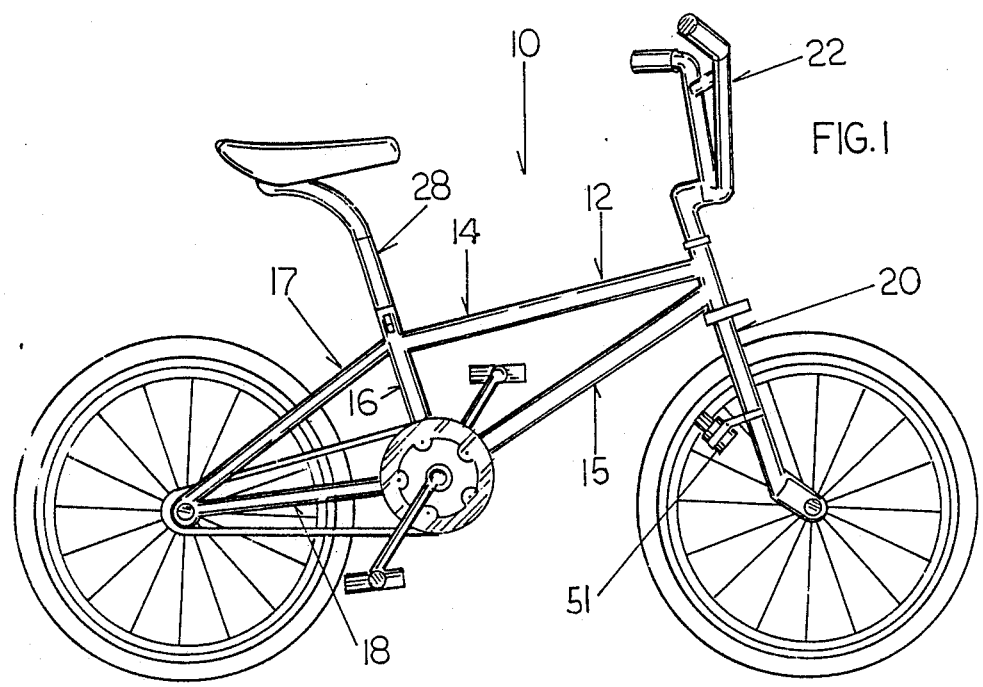
FIG. 1 is a side elevation view of applicant's novel illuminated bicycle.
Figure 2:
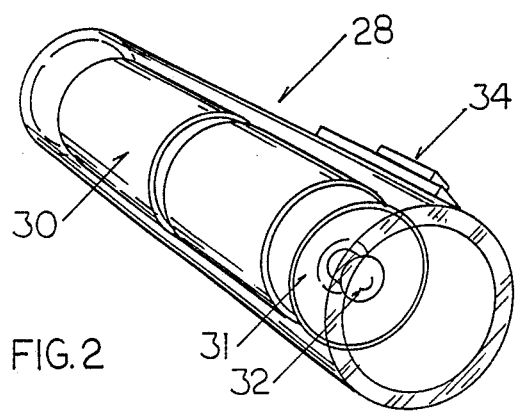
FIG. 2 is a partial perspective view illustrating the light illumination unit mounted in one of the hollow tubular members.

Applicant's novel illuminated bicycle will now be described by referring to FIGS. 1-8 of the drawings. The illuminated bicycle is generally designated numeral 10.

The illuminated bicycle 10 has a body frame 12 formed of hollow tubular members made of plastic material that allows light to be transmitted radially through their side walls. Some of these hollow tubular members are identified top tube 14, bottom tube 15, seat tube 16 and rear support tube 17 and 18. Additionally the forks 20 and the handlebars 22 can also be made of hollow tubular plastic material.

A self contained illumination unit 28 can be mounted in the seat post or one of the other tubular members such as 15. The illumination unit 28 would be formed from a plurality of batteries 30, a reflector 31, a high intensity lamp bulb 32, and a switch 34. These components would be electrically connected in a conventional manner to provide a closed circuit when the switch is operated.

Figure 3:
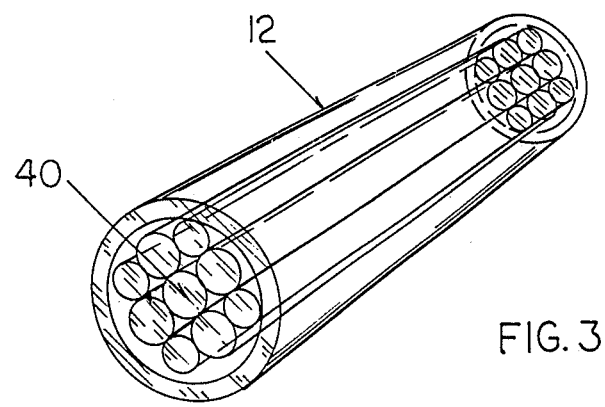
FIG. 3 is a partial perspective view illustrating the bundle of flexible elongated optical fibers threaded within the hollow tubular members.
Figure 4:
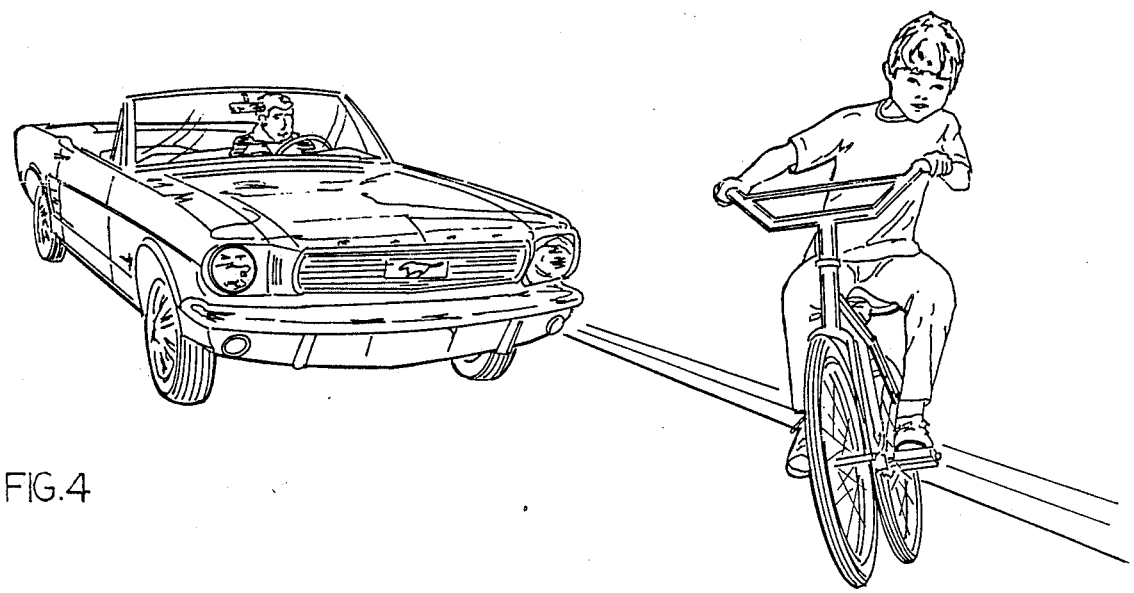
FIG. 4 is an illustration of the illuminated bicycle approaching a passing motorist.

In FIG. 3, a bundle of flexible elongated optical fibers 40 are illustrated. These optical fibers would have their one end positioned adjacent lamp 32 and they would be wound throughout the bicycle body frame 12.

Figure 5:
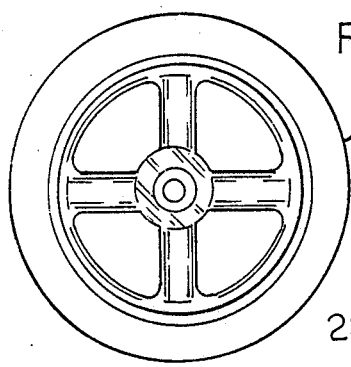
FIG. 5 is a side elevation view of an alternative illuminated wheel structure.

An alternative form of bicycle wheel is illustrated in FIG. 5. Its spokes would be formed of hollow tubular plastic material and a lamp 47 would be positioned adjacent its inner radius end. Each spoke might have its own lamp. The lamp bulb would be electrically connected through conventional structure to the source of power, be it an electrical generator 51 or batteries 30.

Figure 6:
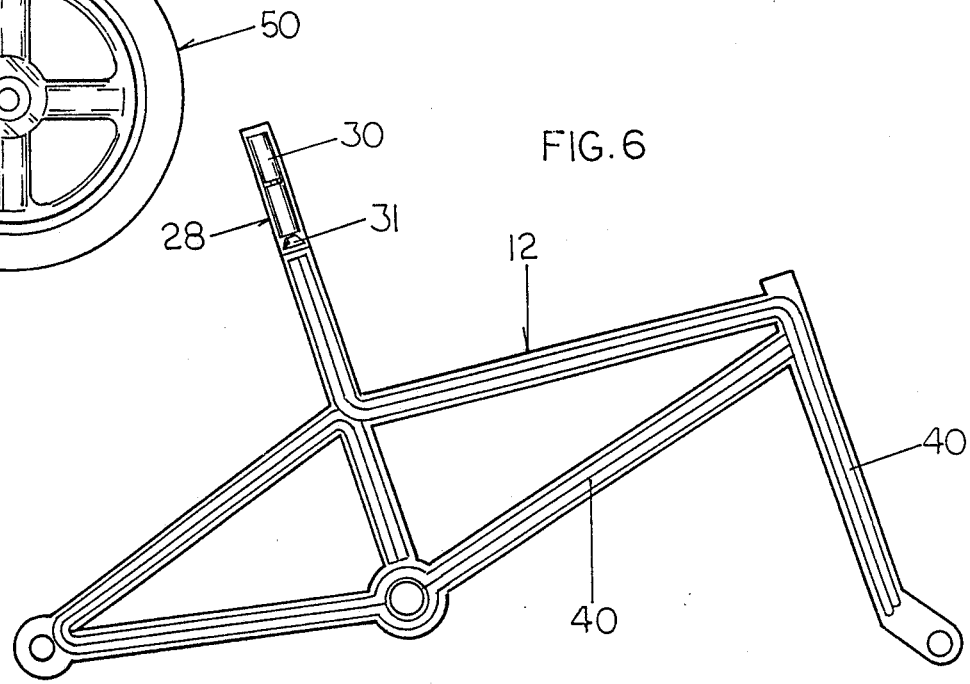
FIG. 6 is a schematic side elevation view of the optical fibers threaded through the frame of the bicycle.
Figure 7:
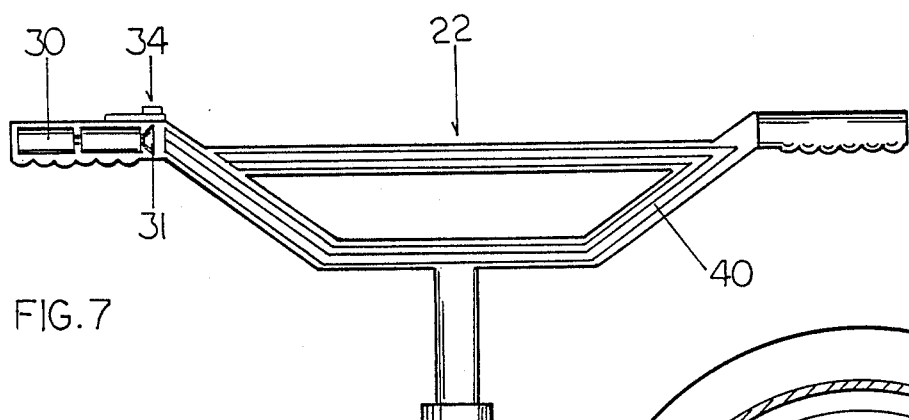
FIG. 7 is a schematic view of the optical fibers threaded through a handlebar.
Figure 8:
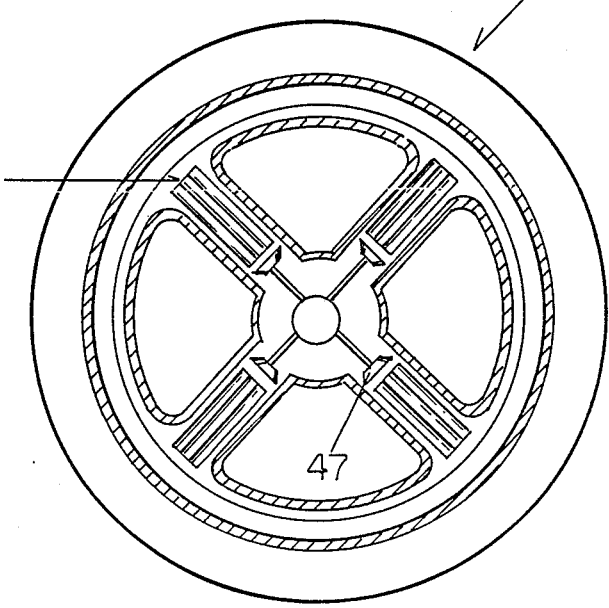
FIG. 8 is a schematic illustration of the optical fibers threaded through the spokes of a wheel.

In FIGS. 6–8, schematic illustrations show the manner in which the flexible elongated optical fibers 40 are threaded through the respective body frame 12, handlebar 40, and wheel 50.

What is claimed is:

1. An illuminated bicycle comprising:
   a body frame having a top tube, a bottom tube and a seat tube; said tubes being hollow and being made of translucent plastic material that allows light to be transmitted radially through their side walls;
   a front wheel and a rear wheel;
   means for mounting said bicycle body frame on said wheels;
   a high intensity lamp having a front end and a rear end, said lamp being mounted at a predetermined location within one of the hollow tubular members of said body frame;
   a bundle of flexible elongated optical fibers having a first end and a second end, the first end of said optical fibers being positioned adjacent the front end of said high intensity lamp so that light therefrom would be transmitted through said optical fibers, said optical fibers being threaded throughout the hollow tubular members of said bicycle frame so that when said lamp is illuminated said bicycle frame will glow and make it highly visible at night;
   a source of electrical power electrically connected to said high intensity lamp; and
   an electrical switch connected to said source of electrical power.

2. An illuminated bicycle as recited in claim 1 wherein said electrical switch is mounted on the exterior of one of the hollow tubular members of the bicycle frame.

3. An illuminated bicycle as recited in claim 1 wherein said source of electrical power are batteries.

4. An illuminated bicycle as recited in claim 3 wherein said batteries are mounted in one of said hollow tubular members adjacent said high intensity lamp.

5. An illuminated bicycle as recited in claim 1 wherein said source of electrical power is a generator mounted adjacent the front wheel of the bicycle.

6. An illuminated bicycle as recited in claim 1 wherein at least one of said wheels has hollow tubular spokes, a high intensity lamp is mounted in at least one of said tubular spokes, and a bundle of elongated optical fibers are positioned within said spoke and extend throughout its length so that when said lamp is illuminated the bicycle spoke will glow and make it highly visible at night.

* * * * *